UNITED STATES PATENT OFFICE.

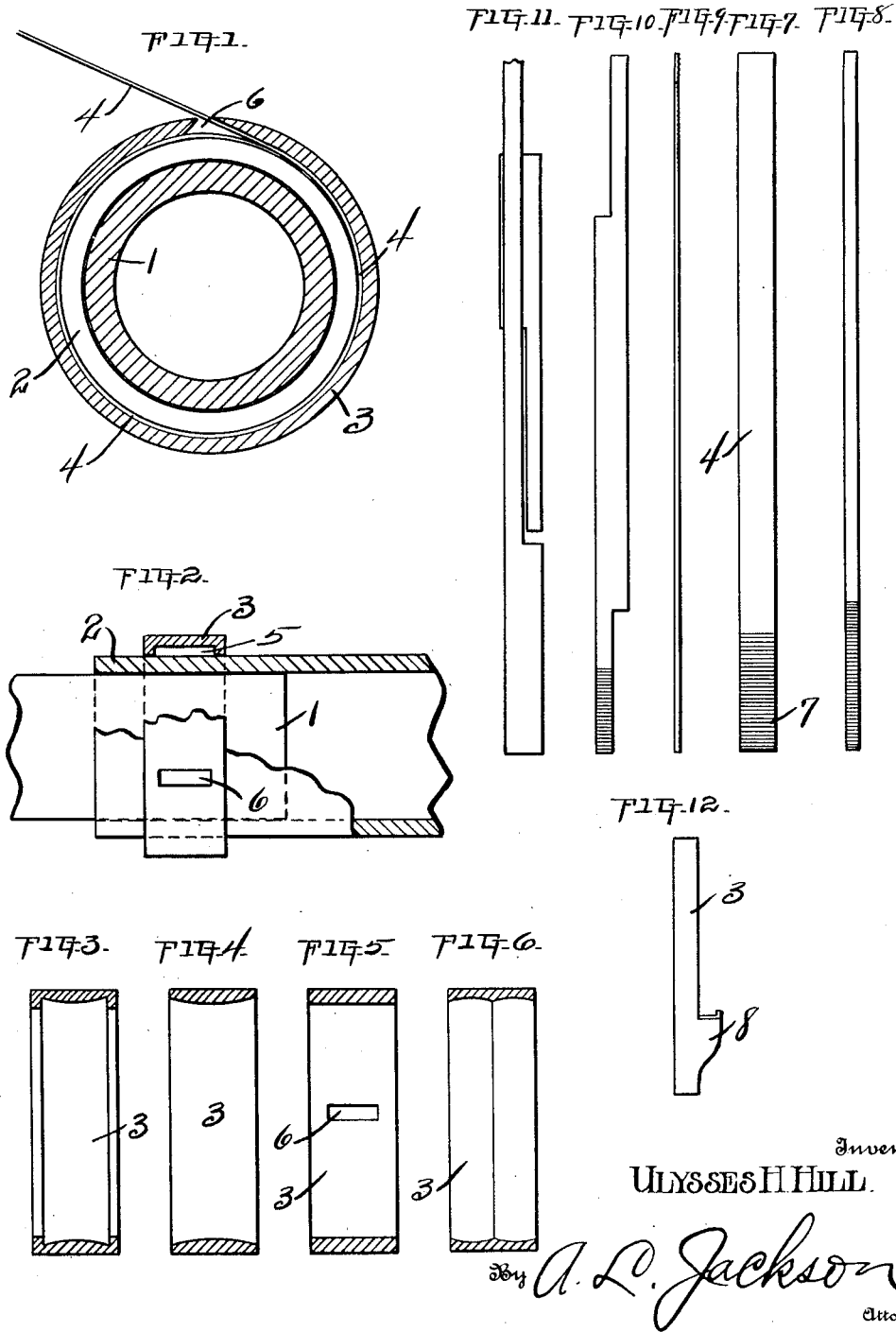

ULYSSES H. HILL, OF SAN ANTONIO, TEXAS.

HOSE CLAMP.

1,408,507.	Specification of Letters Patent.	Patented Mar. 7, 1922.

Application filed December 13, 1921. Serial No. 522,104.

*To all whom it may concern:*

Be it known that I, ULYSSES H. HILL, a citizen of the United States, residing at San Antonio, in the county of Bexar and State of Texas, have invented certain new and useful Improvements in Hose Clamps, of which the following is a specification.

My invention relates to hose couplings and more particularly to detachable hose couplings for coupling a flexible tube or hose to a rigid or metallic pipe; and the object is to provide a device of this character which will not tear or cut the flexible tube or hose but grip the hose and clamp the same against the metal pipe.

Another object is to provide means which will gradually tighten on the hose and be retained by friction and which will automatically release the hose when the clamping devices are reversed. Another object is to provide a clamping device which can be manufactured at small cost and which can be easily installed and which will securely hold the hose in engagement with the metal pipe. Other objects and advantages will be fully explained in the following description and the invention will be more particularly pointed out in the claims.

Reference is had to the accompanying drawings which form a part of this application.

Fig. 1 is a cross-section of a hose clamp and the hose and the metallic pipe, showing a side view of the locking means applied thereto. Fig. 2 is a broken longitudinal section of a hose and the clamp applied to the end of a metal pipe. Fig. 3 is a diametrical or longitudinal section of a clamp, showing a variation in the interior contour of the channel. Fig. 4 is a similar section, showing a clamp without an interior channel. Fig. 5 is a similar section, showing a clamp without an interior channel and showing a flat interior face. Fig. 6 is a similar section, showing a variation in the interior face of the clamp. Fig. 7 shows a locking strip lying flat and showing the end thereof serrated or made rough to make the strip hold by friction. Fig. 8 shows the locking means in the form of a wire with the end thereof serrated or made rough. Fig. 9 shows the locking strip with a gradual taper so that the locking strip will have a wedge effect. Fig. 10 shows a locking strip with the ends cut-away so that the ends will interlock within the channel of the hose clamp. Fig. 11 is a similar view, showing how the strip, in addition to the lapping ends laterally, may have a lapping portion on the outside of the part which engages the hose. Fig. 12 illustrates a variation, showing the receiving slit may be dispensed with and the locking strip inserted on the side of the hose clamp.

Similar characters of reference are used to indicate the same parts throughout the several views.

The drawings show the end of a pipe 1 which is ordinarily of metal. The end of a hose pipe 2 is shown engaging the end of the pipe 1. The clamping means are in two parts,—a metal ring or collar 3 and a locking metallic strip 4, which serves to grip or bind against the hose and the interior wall of the collar or band 3. The collar 3 has a channel 5 on the interior thereof to receive the locking or binding strip 4. The collar or band 3 has an aperture 6 to receive the locking or binding strip 4. The locking strip may be forced in the channel in any suitable manner. The part of the band or collar 3 about the opening 6 is beveled or under-cut so that the strip 4 may be readily started under the collar in the channel 5. The locking strip may be forced into the channel and about the hose or the strip may be fed in and the hose turned within the collar to draw the locking strip around with the hose until enough of the locking strip has been wound on the hose under the collar to lock the clamp on the hose. The locking strip may be manifolded on itself within the channel until the clamp locks the hose to the metal pipe. The clamp may be released by turning the hose in the opposite direction from the direction used when the clamp is locked on the hose. The locking or binding strip 4 may be made of any suitable material and the collar or band 3 may be made of any suitable material. The end 7 of the locking strip 4 may be milled or serrated to make the same rough to secure the requisite friction to make the strip lock securely.

Fig. 3 shows a locking or binding strip provided with a convex wall at the bottom of the channel so that pressure will be relieved from the edges of the locking strip and preventing the edges of the locking strip from tearing or cutting the flexible tube or hose 2.

Figs. 4, 5, and 6 show a band or clamp without a channel on the inside and show variations in the interior contour of the band or collar, all having the same object in binding the locking strip on the hose.

Fig. 8 shows a wire prepared with a serrated end to be used for the filler or binding or locking means.

Fig. 9 is an edge view of a locking or binding strip which is tapering from end to end to have a wedging effect when being placed in the band or collar 3.

Figs. 10 and 11 show a locking or binding strip which may be made interlocking if preferred to accomplish the same results as are above described. Instead of the aperture 6 in the collar 3, an off-set 8 may be formed on the side of the collar to lead to the interior channel of the collar. Various other changes in the sizes, proportions, arrangement, and construction of the several parts may be made without departing from my invention.

What I claim, is,—

1. A coupling for binding a flexible tube or hose to a rigid pipe comprising a collar or ring member provided with an aperture to receive a locking or gripping member and a locking or gripping member inserted in said collar or ring member and about the hose or flexible tube to be locked.

2. A coupling for binding a flexible tube or hose to a rigid pipe comprising a collar or ring member provided with an aperture in the periphery thereof and a locking or gripping member inserted through said aperture in said collar or ring member and manifolded on itself about the hose or flexible tube to be locked.

3. A coupling for binding a flexible tube or hose to a rigid pipe comprising a collar or ring member provided with an aperture in the periphery thereof and having an interior channel and a locking or gripping member inserted through said aperture into said channel and wound on said hose and wedged between the hose and the bottom of said channel for binding the hose on said pipe.

4. A coupling for binding a flexible tube or hose to a rigid pipe comprising a collar or ring member provided with an interior channel and an opening leading to said channel and a locking or gripping member inserted in said channel through said opening and wound on said hose and manifolded on itself and wedged between the bottom of said channel and said hose for clamping the hose on said pipe.

In testimony whereof, I set my hand, this 3rd day of December, 1921.

ULYSSES H. HILL.